Sept. 1, 1936.  M. H. MARTIN  2,052,640
CAR TRUCK
Filed Oct. 8, 1932  5 Sheets-Sheet 2
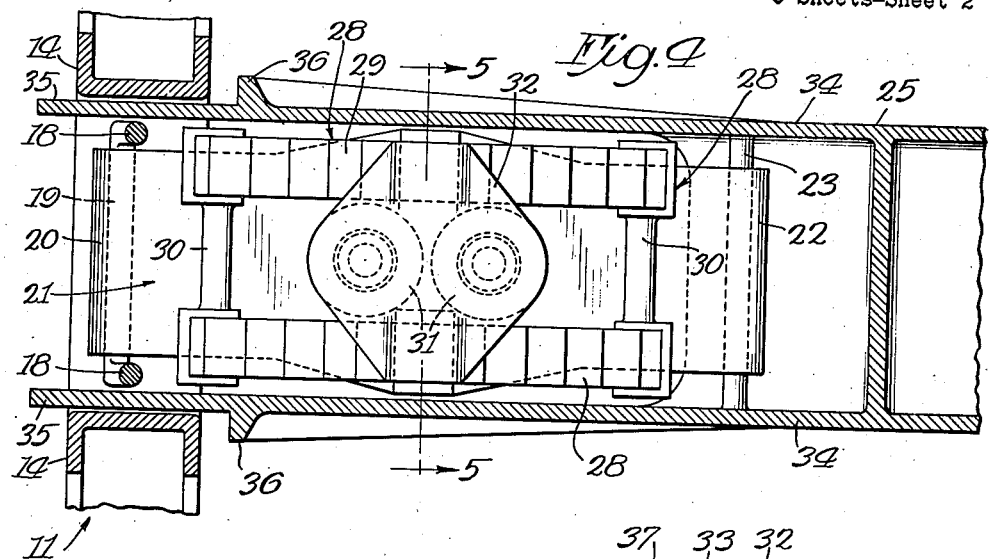
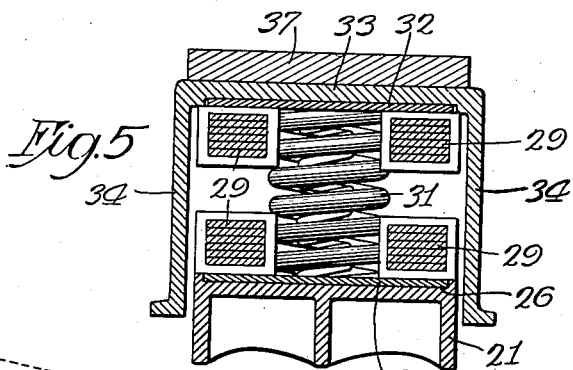
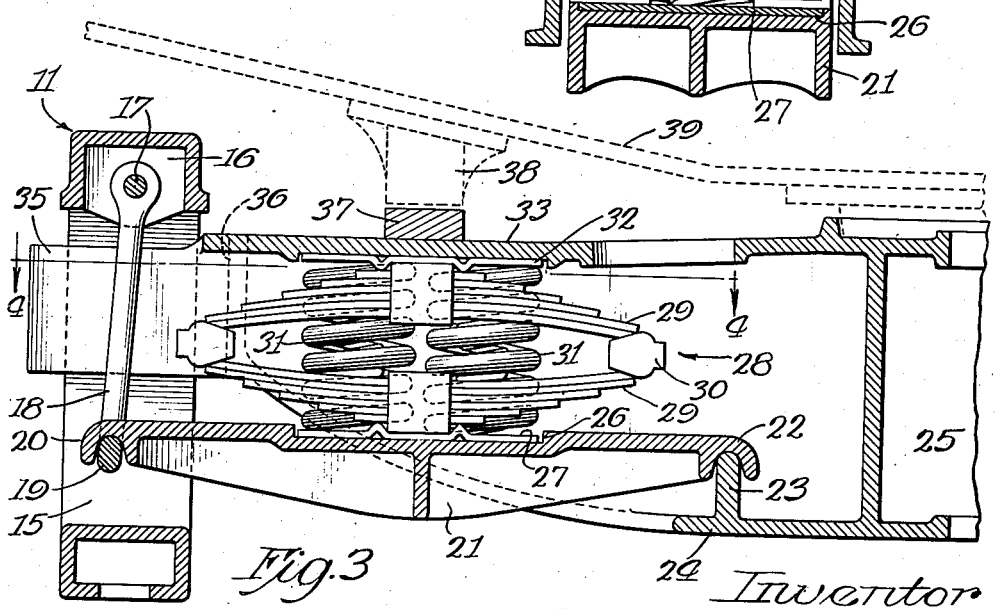
Inventor
Mark H. Martin
By Rector, Hibben, Davis & Macauley Attys.

Sept. 1, 1936.   M. H. MARTIN   2,052,640
CAR TRUCK
Filed Oct. 8, 1932   5 Sheets-Sheet 3
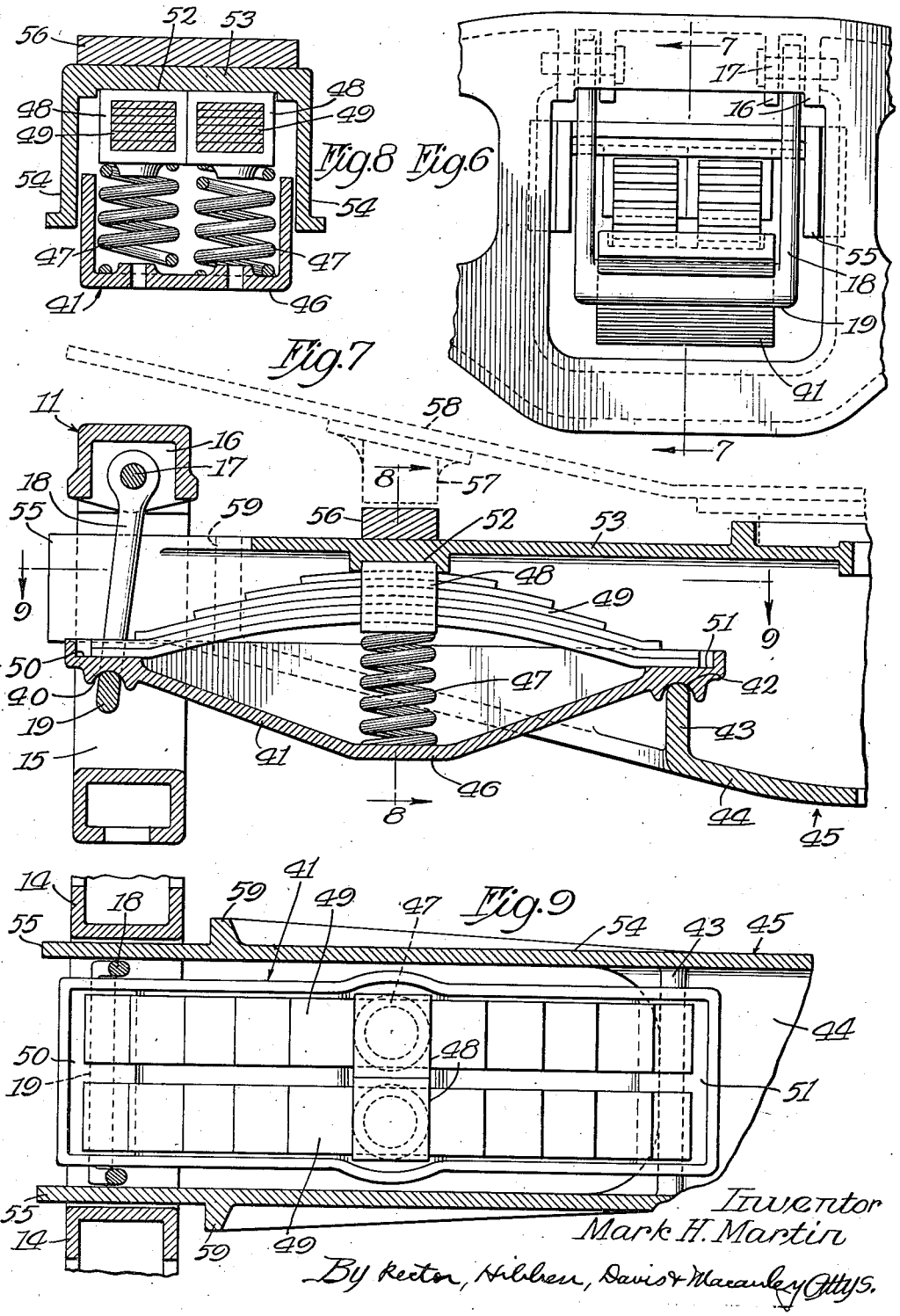
Inventor
Mark H. Martin
By Rector, Hibben, Davis & Macauley Attys.

Sept. 1, 1936. M. H. MARTIN 2,052,640
CAR TRUCK
Filed Oct. 8, 1932 5 Sheets-Sheet 4
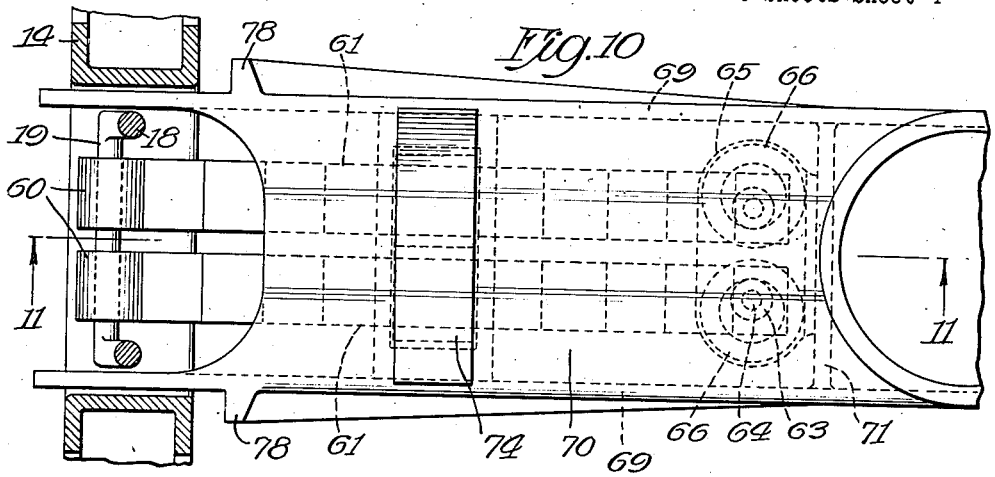
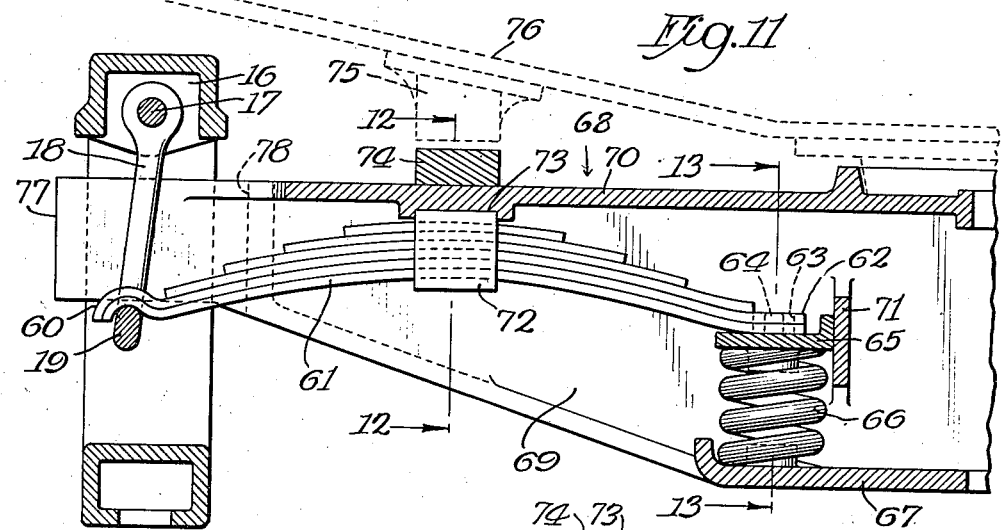
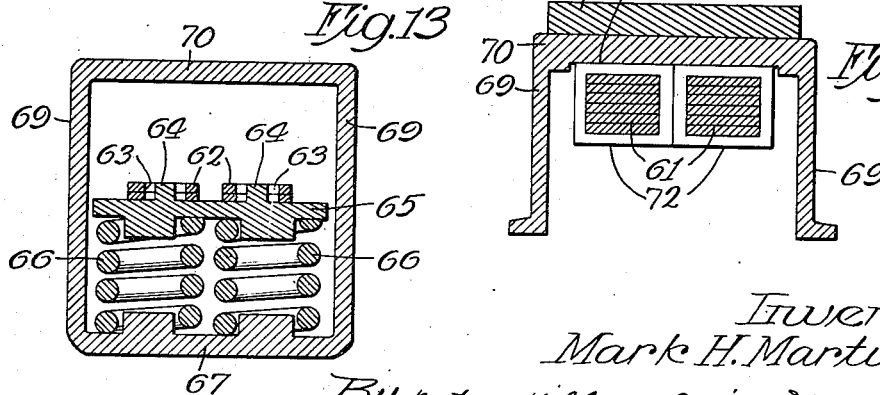
Inventor
Mark H. Martin
By Rector, Hibben, Davis & Macauley Attys.

Sept. 1, 1936.  M. H. MARTIN  2,052,640
CAR TRUCK
Filed Oct. 8, 1932   5 Sheets-Sheet 5
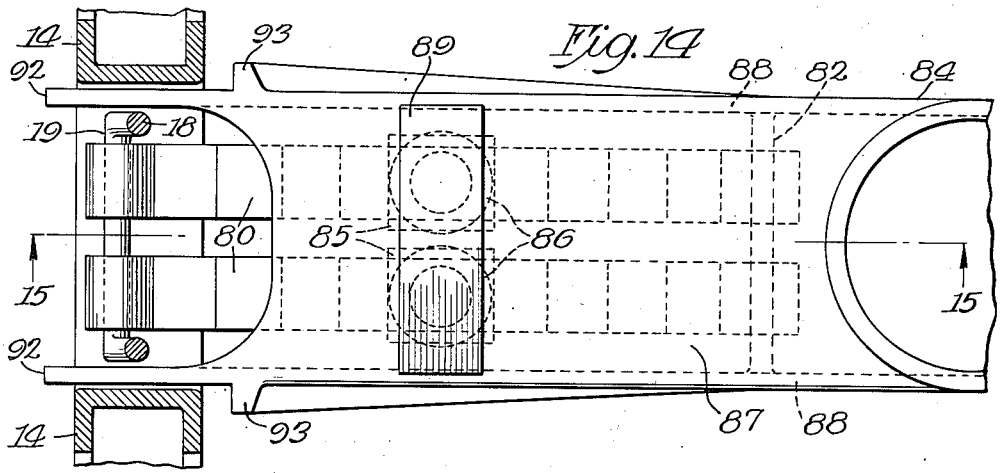
Fig. 14
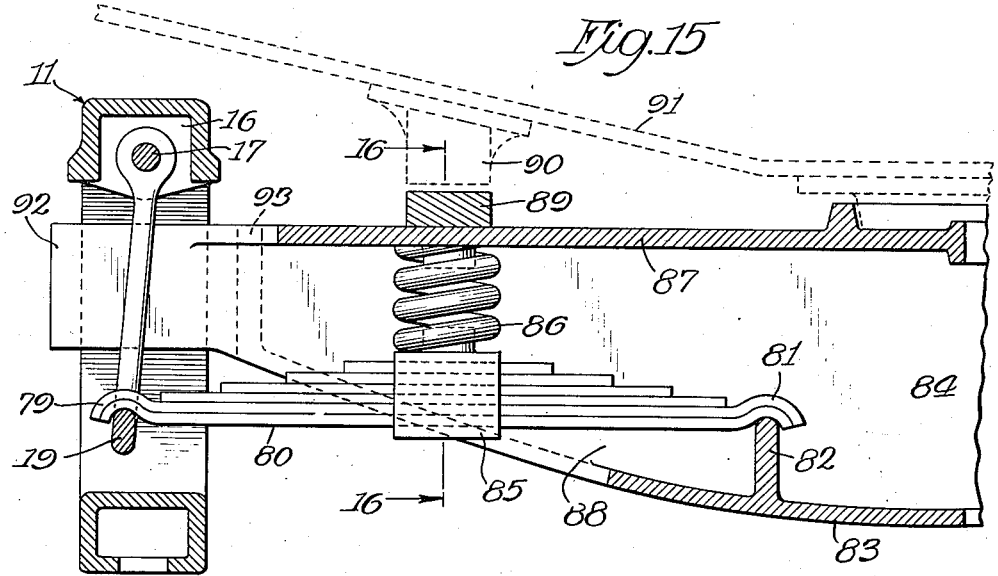
Fig. 15
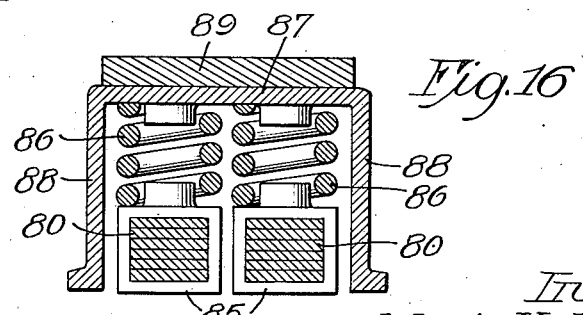
Fig. 16
Inventor:
Mark H. Martin
By Rector, Hibben, Davis & Macauley Attys.

Patented Sept. 1, 1936

2,052,640

UNITED STATES PATENT OFFICE 2,052,640

CAR TRUCK

Mark H. Martin, Reading, Pa., assignor to Birdsboro Steel Foundry & Machine Company, Birdsboro, Pa., a corporation of Pennsylvania Application October 8, 1932, Serial No. 636,809

17 Claims. (Cl. 105—191)

My invention relates to car trucks and more particularly to those of the swing motion type for use in passenger, caboose, freight or tender service.

One object of my invention is to devise a car truck having a truck bolster which is link supported from the compression members of the side frames and which is therefore capacitated to accommodate lateral movements of the car body as the truck traverses a curve or passes over low spots in the track, the disposition of the links insuring a damping action on the swing of the bolster and its return to a centralized position under the action of gravity, and the ends of the bolster additionally extending through the window openings of the side frames for guidable connection therewith in order to hold said frames in alignment transversely of the truck and resist the longitudinal loads occasioned by application of the brakes or a sudden stoppage of the car.

A further object is to provide a car truck of the character indicated in which the bolster is supported at each end upon a spring cluster that is carried by a short beam bridged between the bolster and the link support, the spring assembly having non-harmonic properties for the purpose of improving the riding qualities and increasing the spring capacity of the truck, and also of preventing the vertical "jiggle" characteristic of spring groups composed only of coil springs which frequently results in the latter being driven solid and the transmission of uncushioned shocks directly to the journals, wheels and rails.

A further object is to devise a truck having a spring supported, side frame engaging, swinging bolster having side bearings which are aligned vertically with the spring groups on each side of the truck, with a consequent shortening of the beam length of the bolster and a reduction in the bending stresses imposed thereon, the bolster outwardly of the side bearings requiring only sufficient strength to maintain the transverse alignment of the side frames and to resist longitudinal shocks.

A further object is to provide a truck which is adapted for lateral motion in conjunction with a spring arrangement which lessens damage to lading and equipment, the swinging bolster fulfilling the dual function of transmitting the load to, and of maintaining the squareness of, the side frames, thereby obviating the customary transom and/or spring plank, and considerably reducing the weight of the truck and the number of its parts.

A further object is to devise a car truck which is specially designed to facilitate assembly and replacement of parts at low cost through so arranging the several components that by a simple jacking of the bolster, for example, the side frames and spring groups may be easily removed.

A further object is to provide a car truck having a swing motion bolster, link supported from the side frames, the connection between the links and bolster being in the nature of a non-harmonic spring suspension including a plate spring which, in addition to serving as a cushion for the bolster, also acts as a beam for transferring the load to the links.

These and further objects of my invention will be set forth in the following specification, reference being had to the accompanying drawings, and the novel means by which said objects are effectuated will be definitely pointed out in the claims.

In the drawings:

Fig. 3 is a transverse section of the truck taken along the line 3—3 in Fig. 1, looking in the direction of the arrows, and showing its principal novel features.

Figs. 4 and 5 are sections along the lines 4—4 and 5—5 in Figs. 3 and 4, respectively, looking in the direction of the arrows, and showing the arrangement of the spring suspension.

Figure 1:
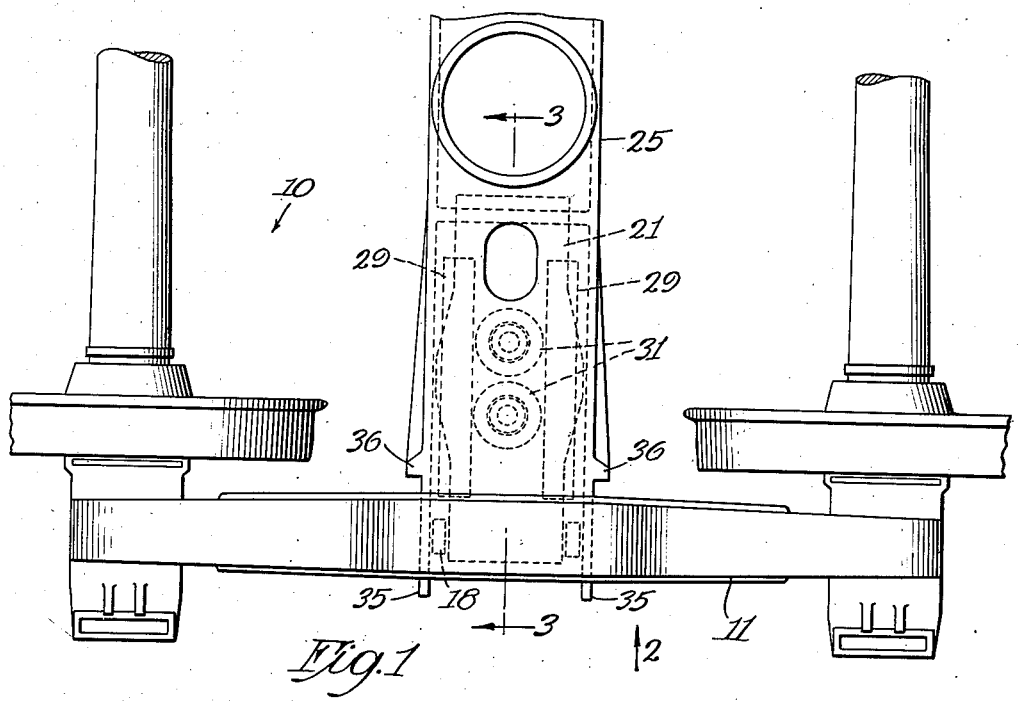
Figure 1 is a partial plan view of one type of my improved truck.
Figure 2:
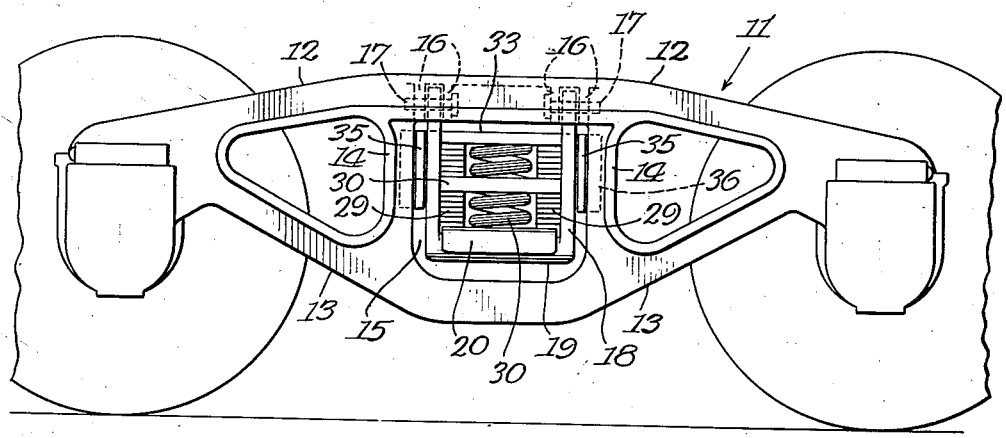
Fig. 2 is a side view of the truck as viewed in the direction of the arrow 2 in Fig. 1.

Fig. 6 is a partial side view of a modified form of the truck, corresponding to the intermediate portion of the truck shown in Fig. 2.

Fig. 7 is a section along the line 7—7 in Fig. 6, looking in the direction of the arrows, and showing the modified form of spring suspension as employed in this particular type of truck.

Figs. 8 and 9 are sections along the lines 8—8 and 9—9, respectively, in Fig. 7, looking in the direction of the arrows, and showing sectionally and in plan, respectively, the spring suspension.

Fig. 10 is a partial plan view, partly in section, of another modification of my improved truck, corresponding to the views shown in Figs. 4 and 9.

Fig. 11 is a transverse section of the truck shown in Fig. 10, taken along the line 11—11 in said figure, looking in the direction of the arrows.

Figs. 12 and 13 are sections taken along the lines 12—12 and 13—13, respectively, in Fig. 11, looking in the direction of the arrows and showing the construction of the spring suspension in two different locations thereof.

Fig. 14 is a partial plan view partly in section, corresponding to the view shown in Fig. 10, of still another modification of my improved truck.

Figs. 15 and 16 are sections along the lines 15—15 and 16—16 in Figs. 14 and 15, respectively, showing the spring suspension which comprises the principal feature of this type of truck.

Referring to Figs. 1 to 5, inclusive, which illustrate one modification, the numeral 10 designates the truck generally which is provided with side frames 11 which may be of the customary integral box or pedestal type. Each frame comprises a compression member 12 and a tension member 13 which are spaced from each other by bolster guide columns 14 that define the usual window or bolster opening 15. The compression member 12 may have the inverted channel section, while the tension member 13 may have the box section, as shown in Fig. 3, although these specific forms of sections are not important features of the invention.

Adjacent the upper ends of each guide column 14 is a pair of spaced webs 16 which extend between the sides of the compression member 12 and preferably also depend from the top thereof. Each pair of webs 16 supports a pin 17 that is substantially located in the vertical center plane of the side frame and pivotally mounted on each pin between each pair of webs is the upper end of one limb of a substantially U-shaped swing link 18, the lower ends of said limbs being joined by a connecting bar 19 which is disposed outwardly of the vertical center plane of the side frame in accordance with standard practice. Loads imposed on said links are accordingly carried by the compression members of the side frames.

Supported on each bar 19 is the grooved, outer end 20 of a beam 21 whose inner end 22 extends toward the center of the truck and may be similarly grooved for support upon an upwardly extending web 23 that projects from the lower web 24 of a truck bolster 25. The beam 21 may have the channel section as illustrated in Fig. 5 in order to provide the necessary strength without adding undue weight, and the nature of its connection to the bolster 25 and to the link 18 is such as to provide a non-shiftable connection with each of these parts.

Intermediate its ends, the beam 21 may be recessed as at 26 to receive the lower spring cap 27 of a spring group 28 composed of two pairs of spaced, semi-elliptic springs 29 whose ends are connected by tie bars 30, and between which are located the coil springs 31. The upper spring cap 32 of the spring group abuts against the underside of the upper web 33 of the bolster, so that the latter is supported upon the spring group which is in turn carried by the beam 21 that is rested on the swing link 18, this construction occurring at both ends of the bolster whereby the latter is capacitated for the desired swinging motion and is also cushioned by the indicated cluster of springs.

The specific arrangement of the springs in the above noted group is not particularly important, since, if desired, the leaf springs may be interposed between the coil springs, or the two sets of springs may be arranged side by side. In this particular modification of the truck, however, it is contemplated that, whatever spring distribution is adopted, the springs will occupy a parallel, load transfer relation to each other.

The upper and lower webs of the bolster are connected by side walls 34 so that the bolster is characterized generally by a box section, within which is substantially housed the spring group 28 and also a considerable portion of the beam 21. These side walls extend outwardly through the window openings 15 and are guided vertically by the bolster guide columns 14. The bolster will accordingly maintain the transverse alignment of the side frames as well as resisting longitudinal shocks occasioned by sudden application of the brakes. As shown clearly in Fig. 3, the upper web 33 of the bolster terminates short of the side frame, as does also the lower web 24, so that the swing links 18 may depend freely from the compression members of the side frame and are specifically located between the frame engaging portions 35 of the bolster side walls 34. Stop lugs 36 extend laterally from the side walls 34 for engagement with the inner sides of the side frames to limit outward movements of the bolster.

Secured to the upper web 33 are the bolster side bearings 37 which are preferably aligned vertically with the vertical axis of the spring group 28 and these side bearings are intended to coact in the customary manner with the body side bearings 38 which are attached to the body bolster 39, both of the latter parts being shown dotted in Fig. 3. By so arranging the side bearings and spring groups, it is possible to considerably reduce the beam length of the bolster with a consequent reduction in the bending stresses resulting from the applied load. Outwardly from the side bearings, therefore, the bolster need only have sufficient strength to hold the side frames in alignment transversely and also resist braking shocks.

So far as the swing motion action of the bolster is concerned, it is generally similar to that now obtaining in trucks characterized by this well known mode of operation, that is, it accommodates lateral movement of the car body, reduces shock from side-lurching, decreases rail and flange wear, and reduces wear on the coupler knuckles and journal bearings. The outwardly inclined disposition of the swing links 18 sets up a damping action against the swinging tendency, of the bolster and positively insures the latter's return to normal, centralized position under the action of gravity after the truck has left a curve, for example, and has entered a straight portion of the track, or after the truck has passed over low spots in the track.

By utilizing spring groups which are characterized by non-harmonic properties, it is possible to provide a truck that is featured by easy riding and a consequent minimization of damage to perishable lading, as well as to the rolling stock itself. Being composed of elliptic and coil springs whose natural periods of vibration are so adjusted to each other, as to positively exercise a damping action, one upon the other, any tendency of the spring group to set up violent oscillations, which now characterizes simple helical spring groups, is positively prevented. A truck of this nature is not only well adapted for passenger service, but also for refrigerator cars which are utilized to transport goods that are susceptible to shocks.

As additional advantages of this particular modification, it may be briefly pointed out that, by extending the bolster through the window openings of the side frames for coaction with the latter, it is possible to entirely eliminate the usual transom, since the bolster, considered in conjunction with its mode of support from the side frames, performs substantially every function for which the transom has heretofore been employed. The bolster, owing to the supporting links being hung in the vertical center plane of the side frames, also fulfills the "squaring" action of the spring plank, with respect to the side frames, so that it is possible to eliminate this customary member of the truck, thus materially reducing the number of component parts and the weight of the truck. It will be particularly noted that, so far as the question of weight is concerned, the beams 21 are not substantially heavier than the weight which would be normally added by continuing the lower web of the bolster, as is ordinarily standard practice.

Owing to the reduction in the number of parts involved, the truck is characterized by a general simplicity of construction which is reflected in low assembly and replacement costs. For example, if it is desired to disassemble the truck, or to remove the side frames, a mere jacking-up of the bolster permits an immediate removal of the side frames, spring groups, and the spring beams 21.

In Figs. 6 to 9, inclusive, there is illustrated a modification of my improved truck which differs from the one just described, essentially in the type of spring suspension employed. As the side frames and swing links are of the same general character as those described in connection with the first truck discussed above, the same numerals will be employed in designating these parts for the truck now in question.

The grooved outer end 40 of a beam 41 is supported on bar 19 of the swing link and the opposite end of said beam extends toward the center of the truck and may be grooved as at 42 to receive the upper end of a web 43 that projects above the lower web 44 of a truck bolster 45. If desired, the beam 41 may be formed with the channel section, as shown clearly in Fig. 8, and the central portion of the web thereof is preferably depressed, as at 46, below the ends 40 and 42. Resting on the depressed portion 46 is a pair of coil springs 47 whose upper ends abut against the underside of a pair of center bands 48 provided on a pair of semi-elliptic springs 49. The springs 49 are bowed upwardly and the outer ends thereof rest upon a seat 50, while the inner ends rest upon a seat 51, both of said seats being provided at the opposite ends, respectively, of the beam 41. The center bands 48 are received within recesses 52 provided on the underside of the upper web 53 of the truck bolster and said upper and lower bolster webs are connected by side walls 54. As shown clearly in Fig. 7, the upper and lower bolster webs terminate short of the side frames, but the side walls 54 thereof are continued to form guide portions 55 that project through the window openings of the side frames and have guiding contact with the bolster guide columns thereof for the same purpose as discussed in connection with the first truck described above. Secured to the top side of the upper bolster web 53 is a bolster side bearing 56 that is aligned vertically with the vertical axis of the spring group and which is intended to coact with the body side bearing 57 shown as attached to the underside of the body bolster 58. In order to limit the transverse, swinging movement of the bolster, the side walls thereof are provided with limiting, stop lugs 59 which are intended to engage with the bolster guide columns of the side frames when the bolster has reached the limit of its movement outwardly of the truck.

As above noted, the instant truck differs from that already described largely in the different type of spring suspension employed. In the present instance, and results obtained approximate those which feature the parallel spring arrangement in the first truck, since each set of springs tends to break up the oscillatory action of the other. This truck possesses a weight saving advantage over the first truck described due to reduction in the number of parts employed and it is also characterized by a general simplicity of construction, resulting in low assembly and replacement costs.

Referring to Figs. 10 to 13, inclusive, there is illustrated a further modification of my improved truck which embodies a wholly different type of spring suspension, as well as incorporating certain other distinctions. As before, the side frames and swing links, except for a possible shortening of the latter, are characterized by substantially the same construction as heretofore described and will therefore be referred to by the same numerals.

Resting upon the connecting bar 19 of each swing link are the outer, hook-shaped ends 60 of a pair of semi-elliptic springs 61 whose opposite ends 62 extend toward the center of the truck and are each provided with an elongated aperture 63, extending transversely of the truck, which receives a centering lug 64 that projects upwardly from a spring pad 65. This pad is movable vertically and rests upon a pair of helical springs 66, each of which is in alignment with an associated leaf spring and which rests upon the lower web 67 of a truck bolster 68. Extending upwardly from the lower bolster web 67 are the bolster side walls 69 which are joined at their tops by the upper bolster web 70. A guide web 71 is bridged between the side walls 69 and it is between this web and said side walls that the spring pad 65 is accommodated for vertical movements upon the compression of the helical springs 66 and the deflection of the leaf springs 61.

The center bands 72 of the leaf springs 61 are received within recesses 73 provided on the underside of the upper web 70, while on the top side of the upper web 70 is secured a bolster side bearing 74 whose vertical axis is substantially in alignment with the vertical axis of the spring group comprising the leaf and helical springs indicated. The bearing 74 coacts in the customary manner with the body side bearing 75 and may be secured to the body bolster 76.

As noted in Fig. 11, the upper and lower webs of the bolster terminate short of the side frames, the former extending closer to the frames than the latter, so that the bolster is characterized by a box section in its intermediate portion which is terminated by the ends of the lower web 67, and a channel section between said last named points and the termination of the upper webs. Beyond the ends of the upper webs the side walls 69 are extended to form guide portions 77 which have sliding engagement with the bolster guide columns for the purpose already noted above. Also, on the outsides of the side walls 69, there is provided the usual stop lugs 78 for limiting outward swinging movement of the bolster.

The principal distinction of this bolster resides in the particular type of spring suspension employed which possesses certain of the attributes embodied in the series spring arrangement noted above. It differs therefrom, however, in that the inner ends of each leaf spring are provided with a cushion support, exemplified by the helical spring 66, thus providing a spring support, generally speaking, that is less likely to transfer to the car shocks that may be produced in the truck, compared to the standard helical form of spring suspension. Preferably, the semi-elliptic springs 61 are relatively long and highly flexible, but are capable, upon the occurrence of minor vibrations, to operate merely as a cantilever beam on the transmission of the load, leaving the helical springs to absorb these small shocks.

Figs. 14 to 16, inclusive, show a still further modification of the truck which is essentially a variation of the truck shown in Fig. 11, since it likewise eliminates the short beams which are utilized in the first two types of structures discussed above. As before, the side frames and swing links are of generally the same construction and will be referred to by the same numerals.

The outer, hooked ends 79 of a pair of substantially flat, leaf springs 80 rest upon the connecting bar 19 of the swing link at each side of the truck, while the opposite ends of said leaf springs may be similarly hook-shaped as at 81 to rest upon and have engagement with the upper end of a web 82 that projects upwardly from the lower web 83 of a truck bolster 84. The intermediate portions of the leaves of each spring are encircled by the usual center bands 85 and seated upon the top surface of each band is a helical spring 86 whose upper end abuts against the underside of the upper web 87 of the bolster, the upper and lower webs of the bolster being connected by side walls 88. Secured to the top surface of the upper bolster web is a bolster side bearing 89 which is in substantially vertical alignment with the vertical axis of the spring group comprising the helical and leaf springs just noted and for the same purpose as has been discussed in connection with the preceding trucks. As before, the bolster bearing 89 is intended to coact with the body side bearings 90 attached to the body bolster 91.

In order to provide for the reception of the spring groups, the lower bolster web 83 terminates at a further distance from the side frames than does the upper web 87, so that the bolster is characterized by a box section at its central portion and by a channel section outwardly from the termination of the lower web to the termination of the upper web. The bolster side walls 88 extend through the window openings of the side frames, as indicated by the numeral 92, to provide guide portions that coact with the bolster guide columns of the frame. The bolster is also provided with the limiting stop lugs 93 for engagement with the side frames.

The principal difference between the spring suspension of the truck and that illustrated in Fig. 11 resides in the different locations of the helical springs. In the present truck, the helical and leaf springs occupy a true series relation with respect to each other in order to improve the riding comfort of the car and break up any tendency toward violent oscillations.

It is also possible in this particular construction to eliminate the spring beams and to utilize the leaf springs for the same purpose. As in the case of the truck shown in Fig. 11, when the track is traversing a relatively smooth road bed, the leaf springs 80 probably will not flex at all, leaving the helical springs 86 to absorb any minor vibrations and provide the required cushion for the truck.

I claim:

1. In a car truck, the combination of side frames having bolster openings, a swing motion bolster having bifurcated ends extending through said openings for guidable connection with said frames, links swingably depending from the compression members of said frames between said ends, the links being inclined outwardly from the vertical planes of the side frames, and connections between said links and bolster.

2. In a car truck, the combination of side frames having bolster openings, a bolster having its ends extending through said openings for guidable connection with said frames, links swingably depending from the compression members of said frames, a beam connecting each link with an adjacent portion of said bolster, and a spring group interposed between each beam and said bolster for transferring the load therebetween, the links swingingly supporting the bolster from the side frames.

3. In a car truck, the combination of side frames having bolster openings, a bolster having its ends extending through said openings for guidable connection with said frames, links swingably depending from the compression members of said frames, a beam connecting each link with an adjacent portion of said bolster, and non-harmonic spring groups interposed between said beams and bolster for transferring the load therebetween, the links swingingly supporting the bolster from the side frames.

4. In a car truck, the combination of side frames having bolster openings, a bolster having its ends extending through said openings for guidable connection with said frames, links swingably depending from the compression members of said frames, a beam connecting each link with an adjacent portion of said bolster, and non-harmonic spring groups comprising leaf and coil springs interposed between said beams and bolster for transferring the load therebetween, the links swingingly supporting the bolster from the side frames.

5. In a car truck, the combination of side frames having bolster openings, a bolster having its ends extending through said openings for guidable connection with said frames, links swingably depending from the compression members of said frames, a beam connecting each link with an adjacent portion of said bolster, and non-harmonic spring groups comprising leaf and coil springs arranged in parallel load-transfer relation interposed between said beams and bolster for transferring the load therebetween, the links swingingly supporting the bolster from the side frames.

6. In a car truck, the combination of side frames having bolster openings, links in said openings swingably depending from the compression members of said frames, a bolster having its ends extending through said openings for guidable connection with said frames, a pair of members located on opposite sides of the center of the bolster, the inner ends of said members being movably connected to said bolster and the outer ends to the adjacent links, and spring groups interposed between said members and the upper side of the bolster.

7. In a car truck, the combination of side frames having bolster openings, links in said openings swingably depending from the compression members of said frames, a bolster having a central box section and its ends extending through said openings for guidable connection with said frames, the lower web comprising a center portion integral with said section and continuations extending outwardly therefrom in the form of relatively movable members, the inner ends of said members being connected to said bolster and the outer ends to the adjacent links, and spring groups interposed between said members and the upper side of the bolster.

8. In a car truck, the combination of side frames having bolster openings, a bolster having its ends extending through said openings for guidable connection with said frames, side bearings on said bolster, spring groups having their axes vertically aligned with the vertical axes of said bearings, respectively, for supporting said bolster, swing links depending from the compression members of said frames, and non-yielding load-transmitting connections between said groups and links.

9. A truck bolster having a spring contacting part and the bottom of each end formed with an opening, a spring supporting member extending through the opening with one end resting on the bolster and the other end adapted for carriage by an associated side frame, and a nest of springs for transferring the load from the part to the member.

10. A truck bolster having a spring contacting part and the bottom of each end formed with an opening, a spring supporting member extending through the opening with one end resting on the bolster and the other end adapted for carriage by an associated side frame, and a nest of springs characterized by non-harmonic action for transferring the load from the part to the member.

11. A truck bolster having a spring contacting part and the bottom of each end formed with an opening, a spring supporting member extending through the opening with one end movably mounted on the bolster and the other end adapted for carriage by an associated side frame, and a nest of springs for transferring the load from the part to the member.

12. A truck bolster of hollow section having a spring contacting part and the bottom of each end formed with an opening, a spring supporting member extending through the opening and forming substantially a continuation of the bottom of the bolster, said member being movably connected at one end to the bottom of the bolster and at the other end being adapted for carriage by an associated side frame, and a nest of springs for transferring the load from the part to the member.

13. In a car truck, the combination of side frames having bolster openings, links in said openings swingably depending from the compression members of said frames, a bolster having its ends extending through said openings, a pair of members located on opposite sides of the center of the bolster, the inner ends of said members being movably connected to the bolster and the outer ends to the adjacent links, and spring groups interposed between said members and the upper side of the bolster.

14. The combination of a truck bolster, a stiff, spring supporting member connected at one end to the bolster and adapted for connection at the opposite end to an associated side frame, and a nest of springs for transferring the load from the bolster to the member.

15. In a car truck, the combination of side frames having bolster openings, a bolster having its ends extending through said openings for guidable connection with said frames, links swingably depending from the compression members of said frames, a beam connecting each link with an adjacent portion of said bolster, and non-harmonic spring groups comprising leaf and coil springs interposed between said beams and bolster, each leaf spring being supported at its ends on the associated beam with its intermediate portion contacting the bolster and each coil spring being interposed between said beam and the intermediate portion of an associated elliptic spring.

16. In a car truck, the combination of side frames having bolster openings, a bolster having its ends extending freely through said openings for guidable connection with said frames, side bearings on said bolster, spring groups having their axes vertically aligned with the vertical axes of said bearings, respectively, for supporting said bolster, and non-yielding, load-transmitting connections non-yieldable in a vertical direction located between said groups and frames.

17. In a car truck, the combination of side frames having bolster openings, a swing motion bolster having its ends extending through said openings for guidable connection with said frames, and link means swingably depending within said openings from the compression members of said frames for supporting said bolster, the link means being inclined outwardly from the vertical planes of the side frames.

MARK H. MARTIN.